United States Patent
Chin et al.

(10) Patent No.: US 9,468,951 B2
(45) Date of Patent: Oct. 18, 2016

(54) SURFACE CLEANING UNMANNED AERIAL VEHICLE

(71) Applicant: Elwha LLC, Bellevue, WA (US)

(72) Inventors: Hon Wah Chin, Palo Alto, CA (US); William Gross, Pasadena, CA (US); Roderick A. Hyde, Redmond, WA (US); Jordin T. Kare, San Jose, CA (US); Nathan P. Myhrvold, Medina, WA (US); Robert C. Petroski, Seattle, WA (US); Clarence T. Tegreene, Mercer Island, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 14/689,916

(22) Filed: Apr. 17, 2015

(65) Prior Publication Data

US 2016/0052027 A1    Feb. 25, 2016

Related U.S. Application Data

(63) Continuation of application No. 14/463,954, filed on Aug. 20, 2014.

(51) Int. Cl.
*B08B 5/02* (2006.01)
*B64C 39/02* (2006.01)
(Continued)

(52) U.S. Cl.
CPC . *B08B 5/02* (2013.01); *A47L 1/02* (2013.01); *B08B 1/00* (2013.01); *B08B 3/02* (2013.01);
(Continued)

(58) Field of Classification Search
CPC .......... B64C 2201/12; B64C 2201/14; B64C 2201/024; B64C 2201/108; B08B 1/04; B08B 5/02; B08B 3/02; H02G 1/02; E04G 23/002
See application file for complete search history.

(56) References Cited

U.S. PATENT DOCUMENTS

| | | | | |
|---|---|---|---|---|
| 3,083,934 A | * | 4/1963 | Vanderlip | B64C 27/20 244/17.25 |
| 2006/0060693 A1 | * | 3/2006 | Poltorak | B64C 27/10 244/17.11 |

(Continued)

FOREIGN PATENT DOCUMENTS

| | | | | |
|---|---|---|---|---|
| AE | WO 2013076711 A2 | * | 5/2013 | A47L 1/02 |
| DE | 102013101194 A1 | * | 8/2014 | B64C 39/024 |

(Continued)

OTHER PUBLICATIONS

Machine translation—DE102013101194; Roettger et al.; Aug. 7, 2014.*

(Continued)

*Primary Examiner* — Michael Kornakov
*Assistant Examiner* — Natasha Campbell
(74) *Attorney, Agent, or Firm* — Foley & Lardner LLP (57) ABSTRACT

Described embodiments include an unmanned aerial vehicle and a method. The unmanned aerial vehicle includes an airframe and a rotary wing system coupled with the airframe and configured to aerodynamically lift the vehicle in the air. The unmanned aerial vehicle includes a flight controller configured to control a movement of the vehicle while airborne. The unmanned aerial vehicle includes a cleansing controller configured to manage a removal of a surface contaminant from a selected portion of a surface of an external object using an airflow generated by the rotary wing system.

15 Claims, 7 Drawing Sheets

(51) Int. Cl.
   *A47L 1/02* (2006.01)
   *H02G 1/02* (2006.01)
   *B08B 1/00* (2006.01)
   *B08B 3/02* (2006.01)
   *E04G 23/00* (2006.01)

(52) U.S. Cl.
   CPC ............ *B64C 39/024* (2013.01); *E04G 23/00* (2013.01); *E04G 23/002* (2013.01); *H02G 1/02* (2013.01); *B08B 1/002* (2013.01); *B64C 2201/024* (2013.01); *B64C 2201/027* (2013.01); *B64C 2201/14* (2013.01); *B64C 2201/148* (2013.01)

(56) References Cited

U.S. PATENT DOCUMENTS

| | | | |
|---|---|---|---|
| 2006/0261975 A1* | 11/2006 | Fridthjof | B60T 8/172 340/905 |
| 2011/0204188 A1 | 8/2011 | Marcus | |
| 2012/0016538 A1 | 1/2012 | Waite et al. | |
| 2012/0150364 A1 | 6/2012 | Tillotson et al. | |
| 2012/0259481 A1* | 10/2012 | Kim | G05D 1/0016 701/2 |
| 2013/0233964 A1 | 9/2013 | Woodworth et al. | |

FOREIGN PATENT DOCUMENTS

| | | | |
|---|---|---|---|
| JP | 2003-026097 A | 1/2003 | |
| KR | 2014-0060901 A | 5/2014 | |
| SE | WO 02084834 A1 * | 10/2002 | ............... H02G 7/16 |

OTHER PUBLICATIONS

Machine translation: KR101400397; Choi, et al.; May 27, 2014.*
PCT International Search Report; International App. No. PCT/US2015/045628; Oct. 30, 2015; pp. 1-3.

* cited by examiner

SURFACE CLEANING UNMANNED AERIAL VEHICLE

CROSS-REFERENCE TO RELATED PATENT APPLICATIONS

This application is a continuation of U.S. patent application Ser. No. 14/463,954, filed Aug. 20, 2014, which is incorporated herein by reference in its entirety.

SUMMARY OF THE INVENTION

For example, and without limitation, an embodiment of the subject matter described herein includes an unmanned aerial vehicle. The unmanned aerial vehicle includes an airframe. The unmanned aerial vehicle includes a rotary wing system coupled with the airframe and configured to aerodynamically lift the vehicle in the air. The unmanned aerial vehicle includes a flight controller configured to control a movement of the vehicle while airborne. The unmanned aerial vehicle includes a cleansing controller configured to manage a removal of a surface contaminant from a selected portion of a surface of an external object using an airflow generated by the rotary wing system.

In an embodiment, the unmanned aerial vehicle includes a proximity sensor configured to generate data indicative of at least one of a distance and a bearing of the external object relative to the vehicle. In an embodiment, the unmanned aerial vehicle includes a sensor carried by the airframe and configured to acquire the data indicative of the surface contaminant. In an embodiment, the unmanned aerial vehicle includes an attachment member having a first portion coupled to the airframe and a second portion configured to removably attach to the external object. In an embodiment, the unmanned aerial vehicle includes a wireless communication device configured to communicate with a base station. In an embodiment, the unmanned aerial vehicle includes a tether controller configured to communicate with a base station via a tether. In an embodiment, the unmanned aerial vehicle includes a power receiver configured to receive wirelessly transmitted energy.

For example, and without limitation, an embodiment of the subject matter described herein includes a method implemented in an unmanned aerial vehicle. The method includes launching the unmanned aerial vehicle. The unmanned aerial vehicle includes a rotary wing system coupled with an airframe and configured to aerodynamically lift, hover, and maneuver the vehicle. The method includes selecting a portion of an exterior surface of an object having a surface contaminant. The method includes maneuvering the vehicle to a working proximity to the selected portion of the surface. The method includes removing the surface contaminant from the selected portion of the surface using an airflow generated by the rotary wing system.

For example, and without limitation, an embodiment of the subject matter described herein includes an unmanned aerial vehicle. The unmanned aerial vehicle includes means for aerodynamically lifting and hovering the unmanned aerial vehicle in the air. The unmanned aerial vehicle includes means for selecting a portion of an exterior surface of an object having a surface contaminant. The unmanned aerial vehicle includes means for aerodynamically maneuvering the vehicle to a working proximity to the selected portion of the surface. The unmanned aerial vehicle includes means for removing the surface contaminant from the selected portion of the surface using an airflow generated by the means for aerodynamically lifting and hovering.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrated embodiments described in the detailed description, drawings, and claims are not meant to be limiting. Other embodiments may be utilized, and other changes may be made, without departing from the spirit or scope of the subject matter presented here.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various implementations by which processes and/or systems and/or other technologies described herein can be effected (e.g., hardware, software, and/or firmware), and that the preferred implementation will vary with the context in which the processes and/or systems and/or other technologies are deployed. For example, if an implementer determines that speed and accuracy are paramount, the implementer may opt for a mainly hardware and/or firmware implementation; alternatively, if flexibility is paramount, the implementer may opt for a mainly software implementation; or, yet again alternatively, the implementer may opt for some combination of hardware, software, and/or firmware. Hence, there are several possible implementations by which the processes and/or devices and/or other technologies described herein may be effected, none of which is inherently superior to the other in that any implementation to be utilized is a choice dependent upon the context in which the implementation will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures suitable to implement an operation. Electronic circuitry, for example, may manifest one or more paths of electrical current constructed and arranged to implement various logic functions as described herein. In some implementations, one or more media are configured to bear a device-detectable implementation if such media hold or transmit a special-purpose device instruction set operable to perform as described herein. In some variants, for example, this may manifest as an update or other modification of existing software or firmware, or of gate arrays or other programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or otherwise invoking circuitry for enabling, triggering, coordinating, requesting, or otherwise causing one or more occurrences of any functional operations described below. In some variants, operational or other logical descriptions herein may be expressed directly as source code and compiled or otherwise invoked as an executable instruction sequence. In some contexts, for example, C++ or other code sequences can be compiled directly or otherwise implemented in high-level descriptor languages (e.g., a logic-synthesizable language, a hardware description language, a hardware design simulation, and/or other such similar mode(s) of expression). Alternatively or additionally, some or all of the logical expression may be manifested as a Verilog-type hardware description or other circuitry model before physical implementation in hardware, especially for basic operations or timing-critical applications. Those skilled in the art will recognize how to obtain, configure, and optimize suitable transmission or computational elements, material supplies, actuators, or other common structures in light of these teachings.

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, module, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will also recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will further recognize that at least a portion of the devices and/or processes described herein can be integrated into an image processing system. A typical image processing system may generally include one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch-sensitive screen or display surface, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will likewise recognize that at least some of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch-sensitive screen or display surface, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Figure 1:
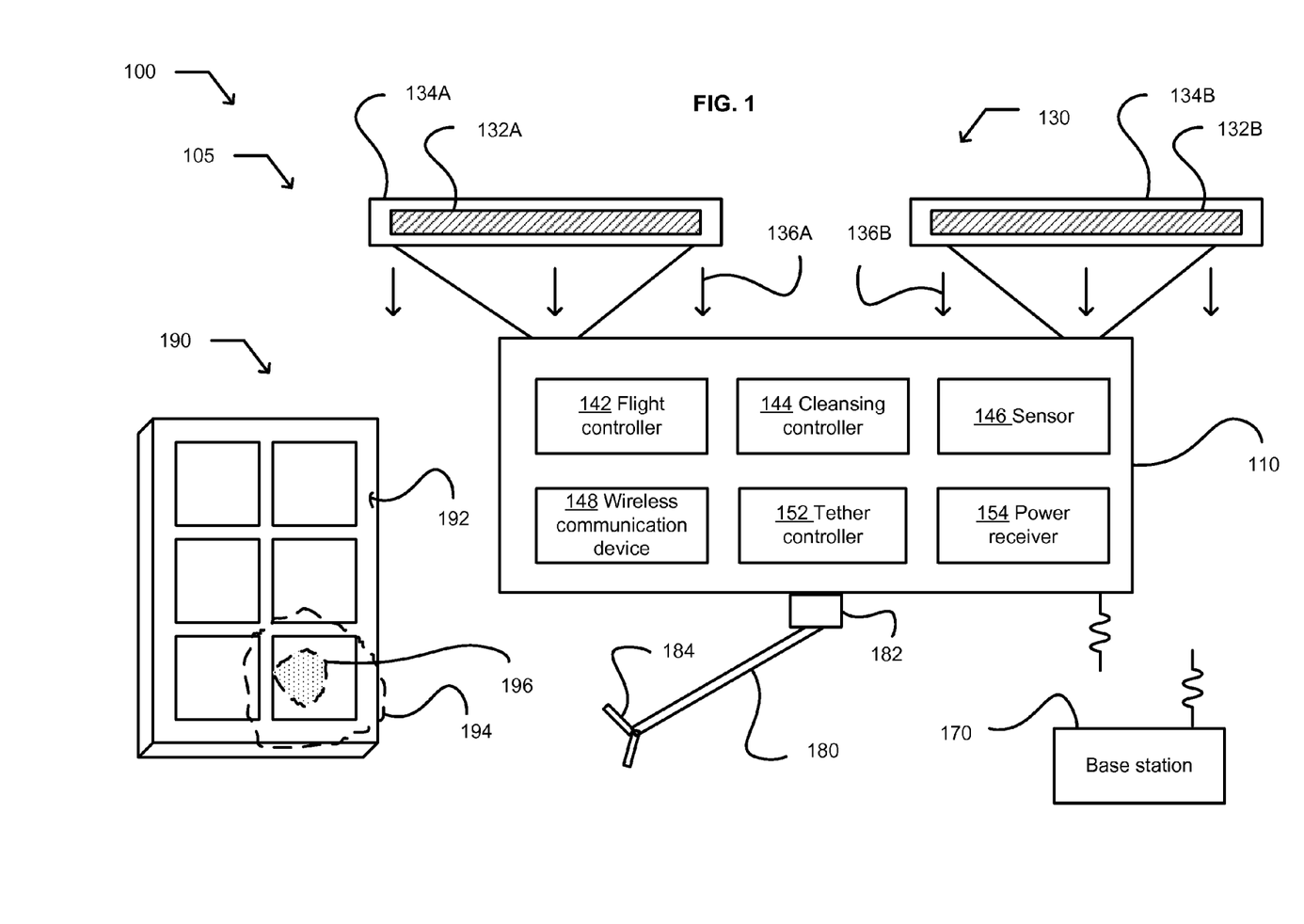
FIG. 1 illustrates an example embodiment of an environment 100 in which embodiments may be implemented.

FIG. 1 schematically illustrates an example environment 100 in which embodiments may be implemented. The environment includes an unmanned aerial vehicle 105, and an external object 190 having an exterior surface 192. The unmanned aerial vehicle includes an airframe 110. The unmanned aerial vehicle includes a rotary wing system 130 coupled to the airframe and configured to aerodynamically lift the vehicle in the air. FIG. 1 illustrates an example embodiment where the rotary wing system includes two rotors, illustrated as rotors 132A and 132B. Airflow 136 from the two rotors is illustrated as a downwash 136A and downwash 136B. In an embodiment, the rotary wing system includes four rotors, such as a quadcopter. In an embodiment, the rotary wing system is configured to aerodynamically lift and hover. In an embodiment, the rotors of the rotary wing system are configured to facilitate controllably directing a portion of the airflow. For example, such configuration may include ducted rotors, illustrated by ducts 134A and 134B.

The unmanned aerial vehicle 105 includes a flight controller 142 configured to control a movement of the vehicle while airborne. In an embodiment, the flight controller includes a flight and guidance controller configured to control a movement and a flight path of the vehicle. In an embodiment, the flight controller is configured to control flight and hovering of the vehicle. The unmanned aerial vehicle 105 includes a cleansing controller 144 configured to manage a removal of a surface contaminant 196 from a selected portion 194 of the surface 192 of the external object 190 using a portion of an airflow generated by the rotary wing system 130. For example, the surface may include an exterior surface of the external object. For example, the cleansing controller may manage directing a portion of the downwash toward the selected portion.

In an embodiment, the rotary wing system 130 includes a helicopter, tri-copter, quad-copter, or quad-rotor configuration. In an embodiment, the rotary wing system includes a protective structure to decrease any damage caused by a contact between the rotary wing system and the external object.

In an embodiment, the flight controller 142 is further configured to control a cleaning route of the vehicle 105 relative to the selected portion 194 of the surface 192. For example, the cleaning route may be random, or may be a specified pattern such as a grid or raster pattern. In an example, the cleaning route or path may be determined by an optimization engine responding to a location or characteristic of the selected portion of the surface, or a characteristic of the surface contaminant 196. In an embodiment, the flight controller is configured to control a cleaning route of the vehicle relative to the selected portion surface in response to a history of a previous cleaning activity. In an embodiment, the flight controller includes an autonomous flight controller. For example, the autonomous flight controller may be responsive to sensor outputs, global positioning data, or visual data. In an embodiment, the flight controller includes a remotely-controlled flight controller. In an embodiment, the flight controller includes a pre-programmed flight controller. In an embodiment, the flight controller is further configured to control a movement of the vehicle relative to the external object 190. In an embodiment, the flight controller is further configured to control a movement of the vehicle relative to the external object in response to data received from a proximity sensor, illustrated as a sensor 146. In an embodiment, the unmanned aerial vehicle includes the proximity sensor configured to generate data indicative of a distance and/or bearing of the external object relative to the vehicle.

In an embodiment, the surface contaminant 196 includes dust, particles, stain, soiling, or something that distorts transmitted light. In an embodiment, the cleansing controller 144 is configured to direct at least a portion of the airflow 136 generated by the rotary wing system 130 at the selected portion 194 of the surface 192 with sufficient force to dislodge the surface contaminant 196. In an embodiment, the flight controller 142 is responsive to an instruction from the cleansing controller to direct at least a portion of the airflow 136 generated by the rotary wing system at the selected portion with sufficient force to dislodge the surface contaminant.

In an embodiment, the external object 190 includes a solar panel. In an embodiment, the external object includes an exterior window of a building or other stationary structure. In an embodiment, the external object includes a component of an electrical power transmission line. In an embodiment, the external object includes a mirror or an array of mirrors.

In an embodiment, the unmanned aerial vehicle 105 includes the sensor 146 carried by the airframe 110 and configured to acquire the data indicative of the surface contaminant 196. In an embodiment, the sensor is configured to acquire data indicative of a contamination state of the surface. For example, a surface contamination state may include a size or characteristic of particles located on a portion of the external surface 192. In an embodiment, the sensor includes an optical sensor. In an embodiment, the sensor includes an ultrasound sensor. In an embodiment, the sensor is configured to detect a response by the surface to a polarized light source. For example, an un-polarized return is likely dirt. Similarly, a presence and amount of a diffuse reflection from a polarized light source can reveal the surface contaminant. In an embodiment, the sensor includes an illumination source and sensor. For example, the illumination source may include an optical wavelength illumination source and sensor. For example, the illumination source may be a broad or narrow beam or source, or may be at one or more selected wavelengths.

In an embodiment, the unmanned aerial vehicle 105 includes an attachment member 180 having a first portion 182 coupled to the airframe 110 and a second portion 184 configured to removably attach to the external object 190. In an embodiment, the attachment member is a controllable or steerable attachment member. In an embodiment, the second portion is configured to removably attach to the external object using a suction device. In an embodiment, the second portion is configured to removably attach to the external object using a positive engagement device. For example, the second portion may attach to an attachment point mounted on or affixed to the external object. For example, the positive engagement device may comprise a magnet (electromagnet of permanent magnet) configured to attach to a magnetically responsive material (e.g., ferromagnetic or paramagnetic material) of the external object or an attachment point affixed to it. In another embodiment, the attachment point may comprise a magnet configured to attach to a magnetically responsive material of the positive engagement device.

In an embodiment, the unmanned aerial vehicle 105 includes a wireless communication device 148 configured to communicate with a base station 170. In an embodiment, the unmanned aerial vehicle includes a tether controller 152 configured to communicate with the base station via a tether. In an embodiment, the tether controller is configured to distribute power received from the base station (e.g., wirelessly or via the tether) to a propulsion unit of the rotary wing system. In an embodiment, the tether controller is configured to distribute power received from the base station to an energy storage device carried by the airframe 110. In an embodiment, the tether controller is configured to communicate flight instructions received from the base station to the flight controller. In an embodiment, the tether controller is configured to communicate data indicative of a contamination state of the surface 192 received from the base station 170 to the cleansing controller 144. In an embodiment, the tether controller is configured to communicate data indicative of a contamination state of the portion of the surface 194 to the base station.

In an embodiment, the base station 170 is a part of the external object 190. In an embodiment, the base station includes a land-based mobile structure. In an embodiment, the base station includes a land-based fixed structure. In an embodiment, the base station includes another airborne device. For example, the airborne device may include another unmanned aerial vehicle or a balloon, carrying a larger power supply.

In an embodiment, the unmanned aerial vehicle 105 includes a power receiver 154 configured to receive wirelessly transmitted energy. For example, the wirelessly transmitted energy may be transmitted by a laser beam, or by microwave. In an embodiment, the power receiver is further configured to convert the received wirelessly transmitted energy into electrical power. In an embodiment, the wirelessly transmitted energy is received from a base station or another airborne device.

Figure 2:
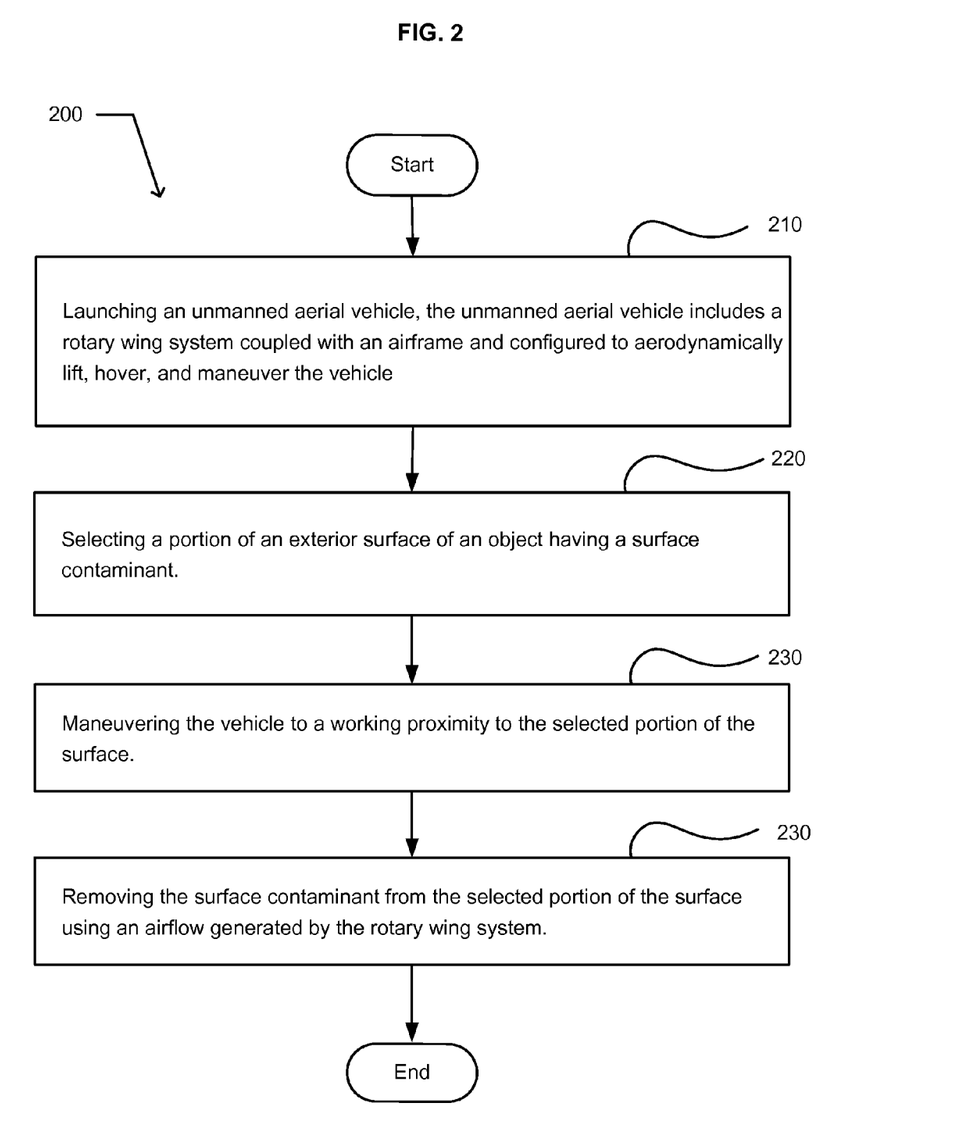
FIG. 2 illustrates an example operational flow 200 implemented in an unmanned aerial vehicle.

FIG. 2 illustrates an example operational flow 200 implemented in an unmanned aerial vehicle. The method includes a takeoff operation 210. The takeoff operation includes launching the unmanned aerial vehicle in the air. The unmanned aerial vehicle includes a rotary wing system coupled with an airframe and configured to aerodynamically lift, hover, and maneuver the vehicle. In an embodiment, launching may include lifting the vehicle off the ground or another base of operations. In an embodiment, launching may include catapulting the vehicle into the air. In an embodiment, launching may include releasing the vehicle from a roof or from a window of a building containing the exterior surface to be cleaned. In an embodiment, the takeoff operation may be implemented by increasing a thrust of the rotary wing system 130 of the unmanned aerial vehicle 105 described in conjunction with FIG. 1 to where it becomes airborne. A choosing operation 220 includes selecting a portion of an exterior surface of an object having a surface contaminant. In an embodiment, the choosing operation includes selecting the portion of the surface of the external object in response to data acquired by a sensor and indicative of a contamination present on the surface of the external object. In an embodiment, the choosing operation may be implemented using the cleansing controller 144 described in conjunction with FIG. 1. A navigation operation 230 includes maneuvering the vehicle to a working proximity to the selected portion of the surface. In an embodiment, the maneuvering the vehicle includes autonomously maneuvering the vehicle. In an embodiment, the maneuvering of the vehicle includes remotely maneuvering the vehicle. For example, remotely maneuvering of the vehicle may include maneuvering in response to remotely initiated instructions. In an embodiment, the navigation operation may be implemented using the flight controller 142 described in conjunction with FIG. 1. A cleaning operation 230 includes removing the surface contaminant from the selected portion of the surface using an airflow generated by the rotary wing system. In an embodiment, the cleaning operation may be implemented using the cleaning controller 144 described in conjunction with FIG. 1. The operational flow includes an end operation.

Figure 3:
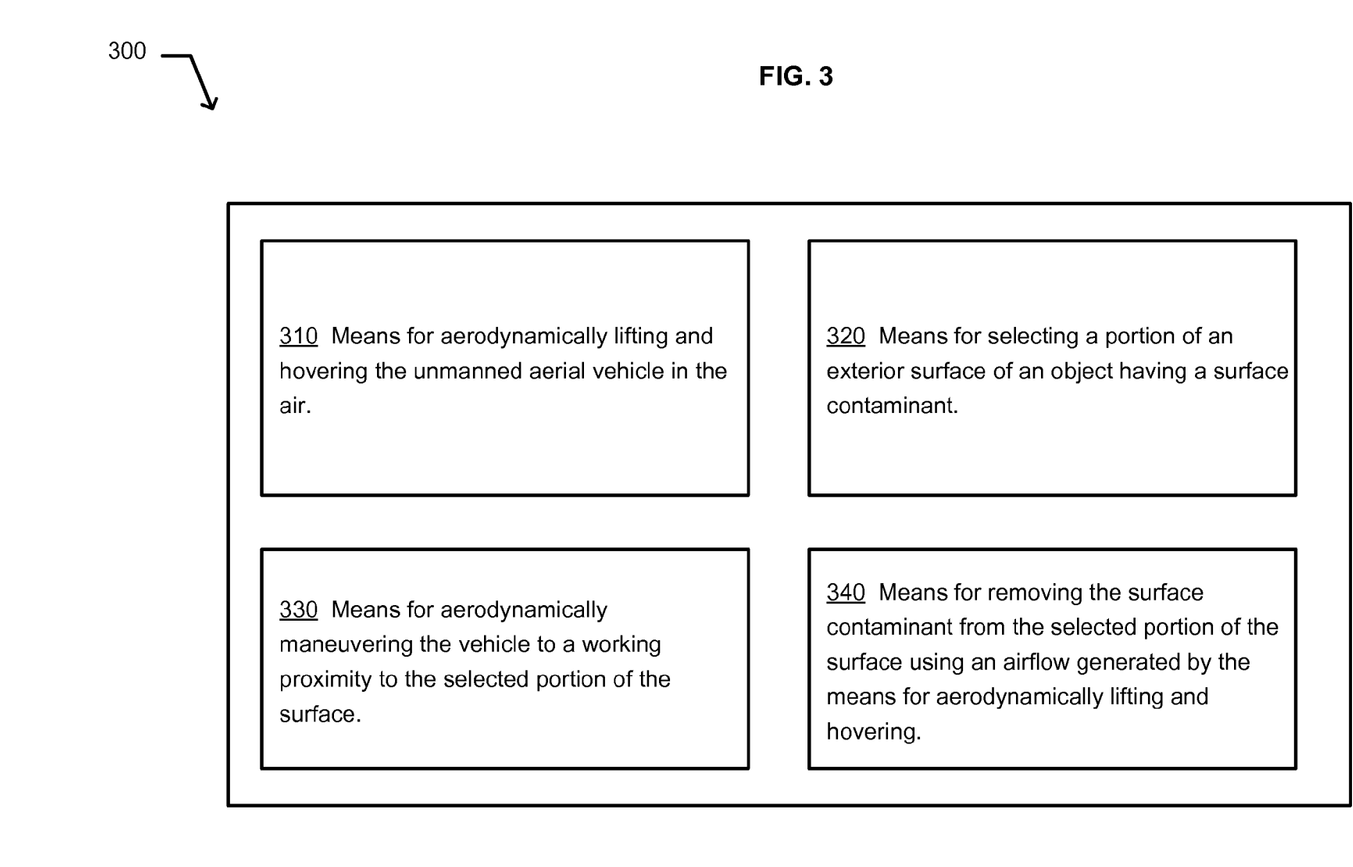
FIG. 3 illustrates an example unmanned aerial vehicle 300.

FIG. 3 illustrates an example unmanned aerial vehicle 300. The vehicle includes means 310 for aerodynamically lifting and hovering the unmanned aerial vehicle in the air. The vehicle includes means 320 for selecting a portion of an exterior surface of an object having a surface contaminant. The vehicle includes means 330 for aerodynamically maneuvering the vehicle to a working proximity to the selected portion of the surface. The vehicle includes means 340 for removing the surface contaminant from the selected portion of the surface using an airflow generated by the means for aerodynamically lifting and hovering.

Figure 4:
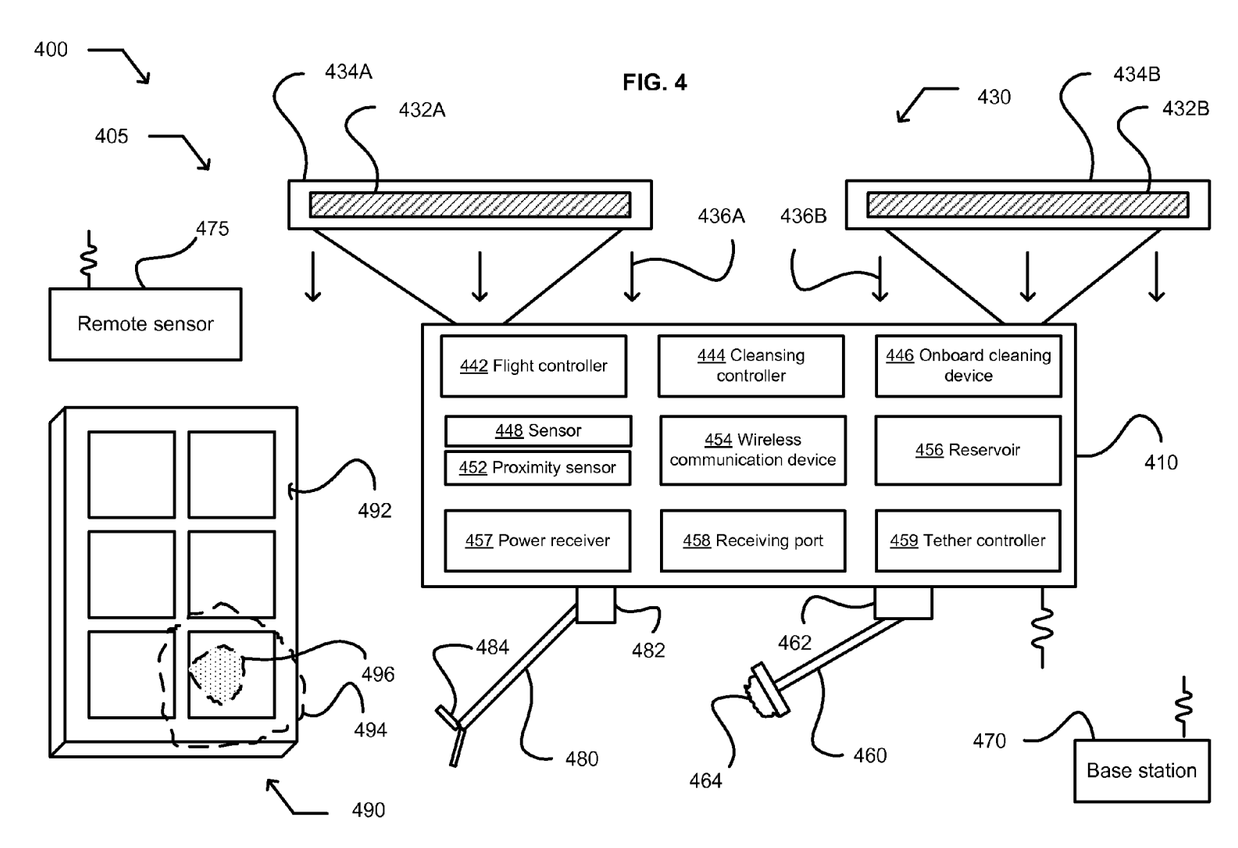
FIG. 4 schematically illustrates an example environment 400 in which embodiments may be implemented.

FIG. 4 schematically illustrates an example environment 400 in which embodiments may be implemented. The environment includes an unmanned aerial vehicle 405, and an external object 490 having an exterior surface 492. The unmanned aerial vehicle includes an airframe 410. The unmanned aerial vehicle includes a rotary wing system 430 coupled to the airframe and configured to aerodynamically lift the vehicle in the air. FIG. 4 illustrates an example embodiment where the rotary wing system includes two rotors, illustrated as rotors 432A and 432B. Airflow from the two rotors is illustrated as a downwash 436A and downwash 436B. In an embodiment, the rotary wing system includes four rotors, such as a quadcopter. In an embodiment, the rotary wing system is configured to aerodynamically lift and hover. In an embodiment, the rotary wing system may include ducted rotors, illustrated by ducts 434A and 434B.

The unmanned aerial vehicle 405 includes a flight controller 442 configured to control a movement of the vehicle while airborne. The unmanned aerial vehicle includes a cleansing controller 444 configured to manage removal by an onboard cleaning device 446 of a surface contamination 496 from a selected portion 494 of a surface 492 of the external object 490. The unmanned aerial vehicle includes the onboard cleaning device.

In an embodiment, the cleansing controller 444 is configured to manage the removal by the onboard cleaning device 446 of the surface contamination 496 from the external object 492 while the unmanned aerial vehicle 405 is airborne. In an embodiment, the cleansing controller is configured to manage the removal by the onboard cleaning device of a surface contamination while the unmanned aerial vehicle is attached to the external object. In an embodiment, the cleansing controller is configured to direct an airstream emitted by the cleaning device at the selected portion of the surface with sufficient force to dislodge the surface contaminant. For example, the airstream may be a dedicated cleaning flow. For example, the cleaning device may include a nozzle or a tube configured to direct an airstream to the selected portion 494.

In an embodiment, the onboard cleaning device 446 includes a container carried by the airframe 410 and configured to store air or other gas. For example, the container may be configured to store pressurized air or other gas. In an embodiment, the cleaning device includes an onboard air pump or fan carried by the airframe and configured to generate an airstream having sufficient force to dislodge the surface contaminant 496. For example, the cleaning device may use local air which is pressurized by the onboard pump. For example, local air may be generated in real-time, or may be buffered using a reservoir. In an embodiment, the onboard cleaning device includes an onboard air pump or fan carried by the airframe and configured to charge or recharge a container carried by the airframe and configured to store air or other gas.

In an embodiment, the cleansing controller 444 is configured to manage the removal of the surface contaminant 496 by the onboard cleaning device 446 in response to data acquired by a sensor 448. In an embodiment, the cleansing controller is configured to select the portion of the surface 494 of the external object 490 in response to data acquired by the sensor and indicative of the surface contamination present on the external object. In an embodiment, the cleansing controller configured to select the portion of the surface in response to the data acquired by the sensor and criteria specifying a threshold level of surface contamination. In an embodiment, the cleansing controller is configured to initiate the removal of the surface contaminant by the cleaning device in response to data acquired by a sensor. In an embodiment, the cleansing controller is configured to terminate the removal of the surface contaminant by the cleaning device in response to data acquired by a sensor.

In an embodiment, the sensor 448 is carried by the airframe 410. In an embodiment, the sensor is a remote sensor 475 and the data acquired by the remote sensor is communicated to the cleansing controller 444.

In an embodiment, the vehicle 405 includes a sensor 448 carried by the airframe and configured to acquire data indicative of a contamination of the portion of the surface 492. For example, the sensor may include a camera, scanner, or optical sensor configured to identify areas to be cleaned. For example, the sensor may be configured to provide data indicative of whether an area has been cleaned enough. In an embodiment, the sensor includes an optical sensor configured to acquire data indicative of a contamination of the surface. For example, the optical sensor may be configured to acquire data indicative of optically distorting particles located on a portion of the external surface. In an embodiment, the sensor includes a camera or other device configured to acquire data indicative of distortions in light reflected by the surface. In an embodiment, the sensor includes an illumination source and sensor.

In an embodiment, the onboard cleaning device 446 includes a movable brush or actuator 464 carried by an elongated member 460 attached to the airframe by an attachment 462. The cleansing controller 444 is configured to direct the brush or actuator to mechanically remove or loosen the surface contaminant 496 from the selected portion 494 of the surface 492. For example, the brush or actuator may be used to weaken a bond between the surface contaminant and the surface so that the portion of an airflow 436 generated by the rotary wing system 430 can blow it off the surface. In an embodiment, the onboard cleaning device includes a movable scraper or squeegee, and the cleansing controller is configured to direct a movement of the scraper across the selected portion of the surface.

In an embodiment, the vehicle 405 includes the brush or other actuator 464 carried by the airframe 410 and configured to mechanically remove or loosen the surface contaminant from the selected portion 494 of the surface 490.

In an embodiment, the cleansing controller 444 is configured to apply a cleaning fluid to the selected portion 494 of the surface 492. For example, the applied cleaning fluid may be used to weaken a bond between the surface contaminant and the surface so that the airflow 436 generated by the rotary wing system 430 can blow it off the surface. In an embodiment, the cleaning fluid may include water, detergent surfactant, abrasive, or other substance facilitating a cleaning of the selected portion of the surface. In an embodiment, the cleaning fluid includes a spray charge configured to electrostatically de-bond the surface contaminant. In an embodiment, the cleansing controller is configured to recover and reuse at least a portion of the cleaning fluid from the surface.

In an embodiment, the vehicle 405 includes a reservoir 456 carried by the airframe 410 and configured to contain a cleaning fluid. In an embodiment, the vehicle includes: a receiving port 458 carried by the airframe and configured to receive a cleaning fluid through a conduit while airborne. In an embodiment, the port is configured to receive a cleaning fluid from a conduit coupled with a base station 470. In an embodiment, the receiving port is configured to receive a cleaning fluid from a conduit coupled with another unmanned aerial vehicle.

In an embodiment, the vehicle 405 includes a wireless communication device 454 configured to communicate with the base station 470. In an embodiment, the vehicle includes a tether controller 459 configured to communicate with the base station via a tether. In an embodiment, the tether controller is configured to receive a cleaning fluid from a base station. For example, the cleaning fluid may be communicated directly to the cleaning controller for usage, or may be transferred to the reservoir 456 for later usage.

In an embodiment, the base station 470 includes another airborne device. For example, the another airborne device may include another unmanned aerial vehicle or a balloon, carrying a tank configured to contain a larger volume of cleaning fluid than the reservoir 456.

In an embodiment, the flight controller 442 is further configured to counteract or cancel unwanted forces or torques created by a use of the onboard cleaning device 446. In an embodiment, the flight controller is further configured to control a cleaning movement or route of the vehicle relative to the selected portion 494 of the surface 492. For example, the cleaning route may be random, or may be a specified pattern (e.g., grid or raster). In an embodiment, the flight controller is configured to control a cleaning movement of the vehicle relative to the selected portion surface in response to a record of a previous cleaning activity. In an embodiment, the flight controller is further configured to control a movement of the vehicle relative to the external object 490. In an embodiment, the flight controller is further configured to control a movement of the vehicle relative to the external object in response to data received from a proximity sensor 452.

In an embodiment, the vehicle 405 includes the proximity sensor 452 configured to generate data indicative of a distance and/or bearing of the external object 490 relative to the vehicle. In an embodiment, the vehicle includes a power receiver 457 configured to receive wirelessly transmitted energy. For example, the wireless energy may include laser or microwave energy transmitted from the base station 470 or another airborne device. In an embodiment, the vehicle includes an attachment member 480 having a first portion 482 coupled to the airframe 410 and a second portion 484 configured to removably attach to the external object 490.

Figure 5:
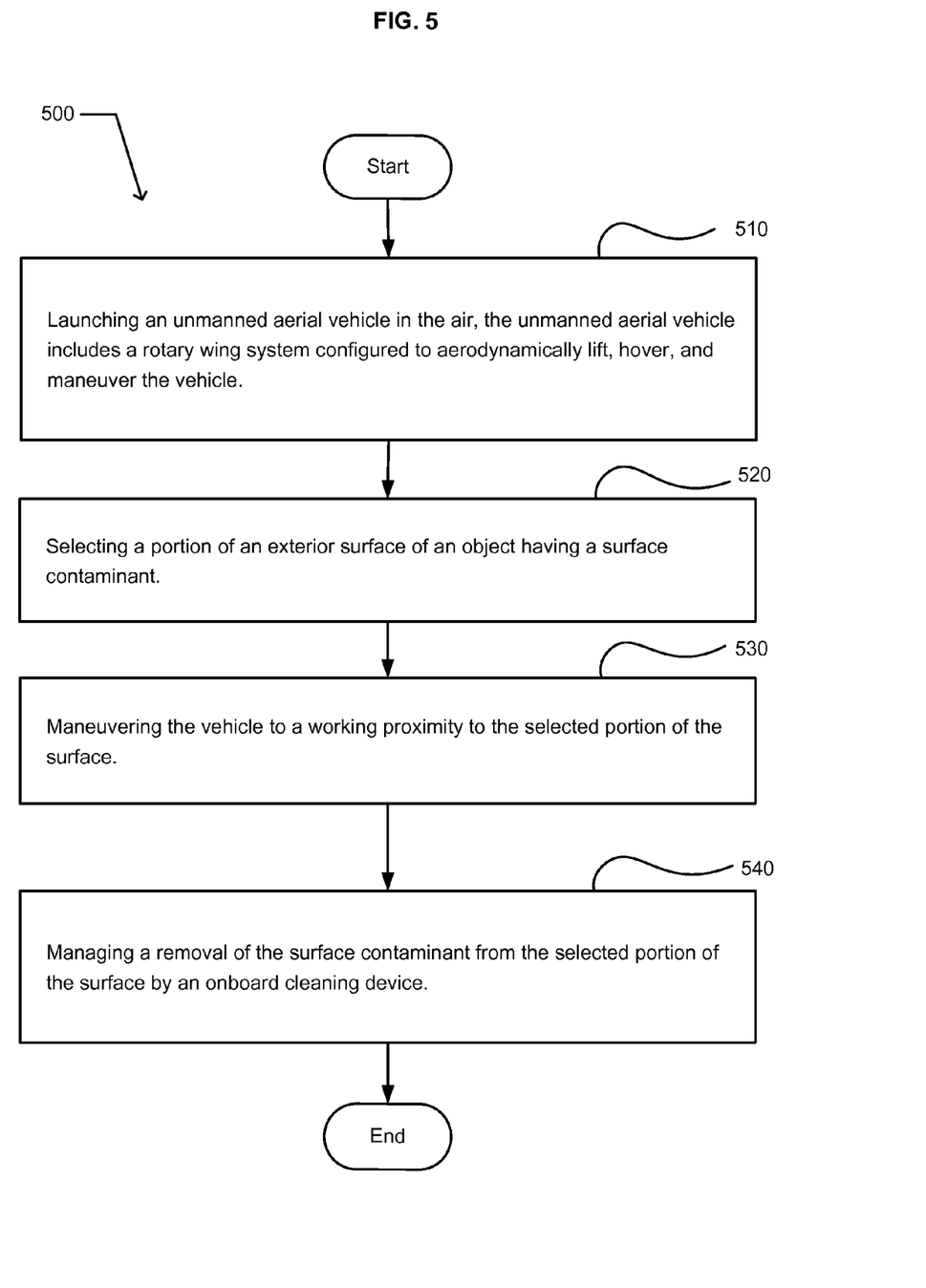
FIG. 5 illustrates an example operational flow 500 implemented in an unmanned aerial vehicle.

FIG. 5 illustrates an example operational flow 500 implemented in an unmanned aerial vehicle. After a start operation, the operational flow includes a takeoff operation 510. The takeoff operation includes launching the unmanned aerial vehicle in the air. The unmanned aerial vehicle includes a rotary wing system configured to aerodynamically lift, hover, and maneuver the vehicle. In an embodiment, the takeoff operation may be implemented by increasing a thrust of the rotary wing system 430 of the unmanned aerial vehicle 405 described in conjunction with FIG. 4 to where it becomes airborne. A choosing operation 520 includes selecting a portion of an exterior surface of an object having a surface contaminant. In an embodiment, the choosing operation may be implemented using the cleansing controller 444 described in conjunction with FIG. 4. A navigation operation 530 includes maneuvering the vehicle to a working proximity to the selected portion of the surface. In an embodiment, the navigation operation may be implemented using the flight controller 442 described in conjunction with FIG. 4. A cleaning operation 540 includes managing a removal of the surface contaminant from the selected portion of the surface by an onboard cleaning device. The cleaning operation may be implemented using the cleansing controller 444 to manage the onboard cleaning device 446 described in conjunction with FIG. 4. The operational flow includes an end operation.

In an embodiment, the navigation operation 530 includes autonomously maneuvering the vehicle. In an embodiment, the navigation operation includes maneuvering the vehicle by remote control. In an embodiment, the choosing operation 520 includes selecting the portion of the surface of the external object in response to data acquired by a sensor and indicative of a contamination present on the surface of the external object.

In an embodiment, the cleaning operation 540 further includes terminating the removal of the surface contaminant by the cleaning device in response to data acquired by a sensor. In an embodiment, the operational flow 500 includes supplying the onboard cleaning device with a cleaning fluid through a conduit while airborne. In an embodiment, the operational flow 500 receiving wirelessly transmitted energy while airborne.

Figure 6:
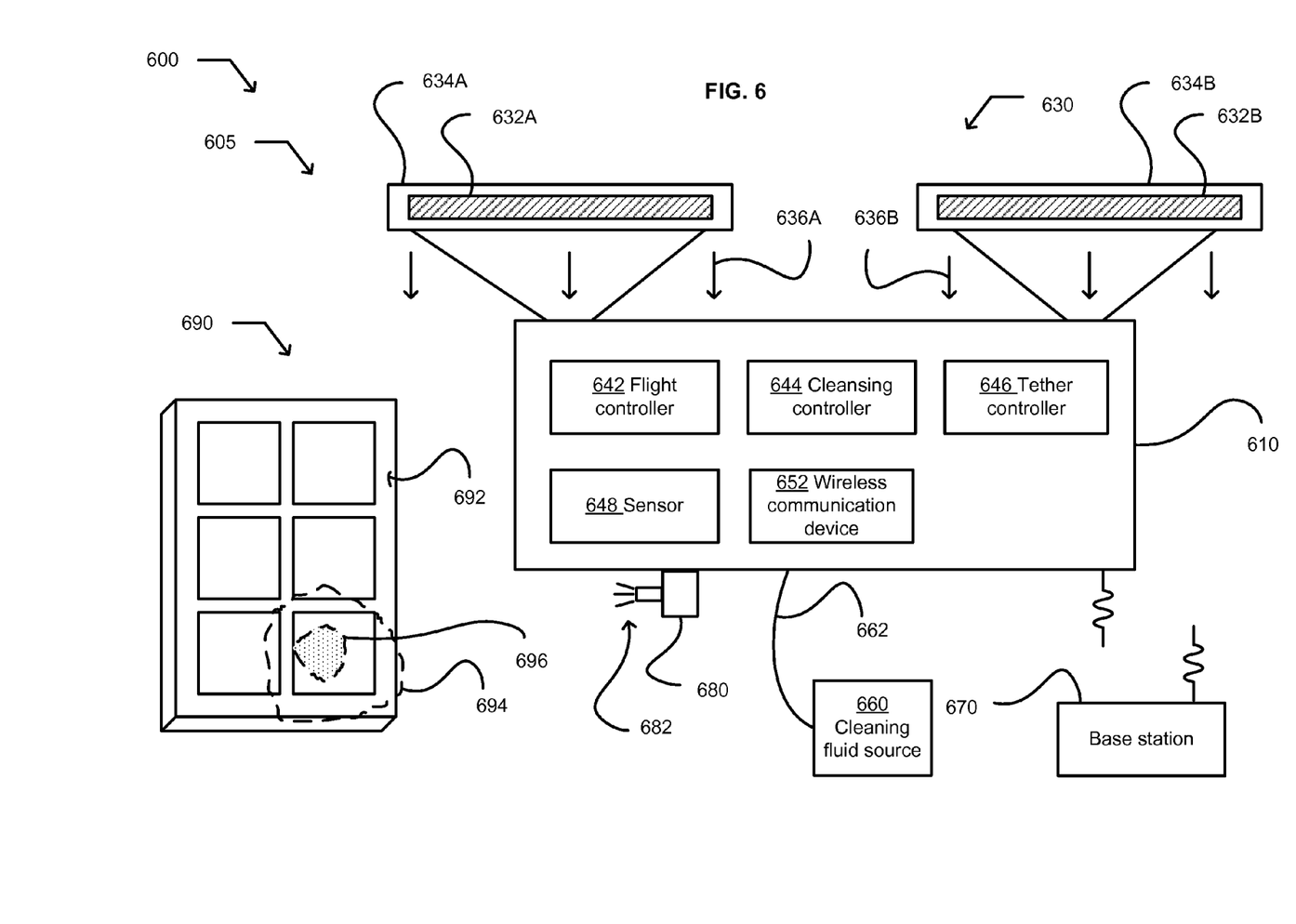
FIG. 6 schematically illustrates an example environment 600 in which embodiments may be implemented.

FIG. 6 schematically illustrates an example environment 600 in which embodiments may be implemented. The environment includes an unmanned aerial vehicle 605, and an external object 690 having an exterior surface 692. The unmanned aerial vehicle includes an airframe 610. The unmanned aerial vehicle includes a rotary wing system 630 coupled to the airframe and configured to aerodynamically lift the vehicle in the air. FIG. 6 illustrates an example embodiment where the rotary wing system includes two rotors, illustrated as rotors 632A and 632B. Airflow 636 from the two rotors is illustrated as a downwash 636A and downwash 636B. In an embodiment, the rotary wing system includes four rotors, such as a quadcopter. In an embodiment, the rotary wing system is configured to aerodynamically lift and hover. In an embodiment, the rotary wing system may include ducted rotors, illustrated by ducts 634A and 634B.

The unmanned aerial vehicle 605 includes a flight controller 642 configured to control a movement of the vehicle while airborne. The unmanned aerial vehicle includes a cleansing controller 644 configured to receive a cleaning fluid from a conduit 662 connected to an external source, illustrated as a cleaning fluid source 660, and to direct the cleaning fluid at a selected portion 694 of a surface 692 of an external object 690.

In an embodiment, the aerial vehicle 605 includes a directionally controllable nozzle 680 configured to direct the cleaning fluid 682 at the selected portion 694 of the surface 692 of the external object 690. In an embodiment, the cleansing controller 644 is configured to control the directionally controllable nozzle. In an embodiment, the conduit 662 is coupled between the vehicle and a base station 670. In an embodiment, the base station includes another airborne device.

In an embodiment, the vehicle 605 includes a sensor 648 carried by the airframe 610 and configured to acquire data indicative of the surface contaminant 696. In an embodiment, the cleansing controller 644 is further configured to manage removal of the surface contaminant by the cleaning fluid 682 in response to the data acquired by the sensor. In an embodiment, the unmanned aerial vehicle 605 includes a wireless communication device 652 configured to communicate with a base station 670.

Figure 7:
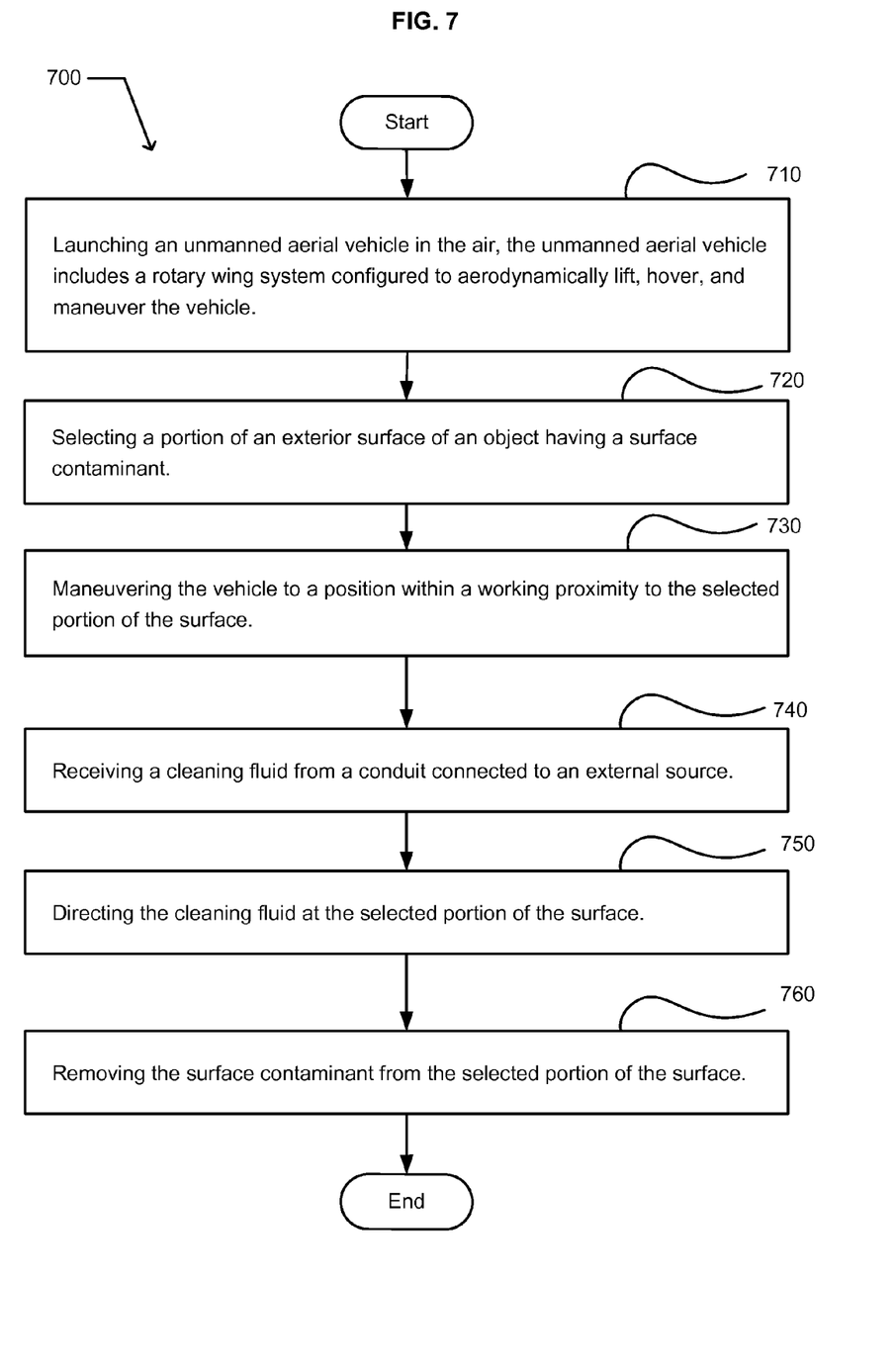
FIG. 7 illustrates an example operational flow 700 implemented in an unmanned aerial vehicle.

FIG. 7 illustrates an example operational flow 700 implemented in an unmanned aerial vehicle. After a start operation, the operational flow includes a takeoff operation 710. The takeoff operation includes launching the unmanned aerial vehicle in the air. The unmanned aerial vehicle includes a rotary wing system configured to aerodynamically lift, hover, and maneuver the vehicle. In an embodiment, the takeoff operation may be implemented by increasing a thrust of the rotary wing system 630 of the unmanned aerial vehicle 605 described in conjunction with FIG. 6 to where it becomes airborne. A choosing operation 720 includes selecting a portion of an exterior surface of an object having a surface contaminant. In an embodiment, the choosing operation may be implemented using the cleansing controller 644 described in conjunction with FIG. 6. A navigation operation 730 includes maneuvering the vehicle to a position within a working proximity to the selected portion of the surface. In an embodiment, the navigation operation may be implemented using the flight controller 642 described in conjunction with FIG. 6. A loading operation 740 includes receiving a cleaning fluid from a conduit connected to an external source. In an embodiment, the loading operation may be implemented using the tether controller 646 to manage reception of the cleaning fluid 682 via the conduit 662 from the cleaning fluid source 660 as described in conjunction with FIG. 6. A washing operation 750 includes directing the cleaning fluid at the selected portion of the surface. In an embodiment, the washing operation may be implemented using the directionally controllable nozzle 680 described in conjunction with FIG. 6. A separation operation 760 includes removing the surface contaminant from the selected portion of the surface. The operational flow includes an end operation.

All references cited herein are hereby incorporated by reference in their entirety or to the extent their subject matter is not otherwise inconsistent herewith.

In some embodiments, "configured" includes at least one of designed, set up, shaped, implemented, constructed, or adapted for at least one of a particular purpose, application, or function.

It will be understood that, in general, terms used herein, and especially in the appended claims, are generally intended as "open" terms. For example, the term "including" should be interpreted as "including but not limited to." For example, the term "having" should be interpreted as "having at least." For example, the term "has" should be interpreted as "having at least." For example, the term "includes" should be interpreted as "includes but is not limited to," etc. It will be further understood that if a specific number of an introduced claim recitation is intended, such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a receiver" should typically be interpreted to mean "at least one receiver"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "at least two chambers," or "a plurality of chambers," without other modifiers, typically means at least two chambers).

In those instances where a phrase such as "at least one of A, B, and C," "at least one of A, B, or C," or "an [item] selected from the group consisting of A, B, and C," is used, in general such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as A1, A2, and C together, A, B1, B2, C1, and C2 together, or B1 and B2 together). It will be further understood that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The herein described aspects depict different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable or physically interacting components or wirelessly interactable or wirelessly interacting components.

With respect to the appended claims the recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Use of "Start," "End," "Stop," or the like blocks in the block diagrams is not intended to indicate a limitation on the beginning or end of any operations or functions in the diagram. Such flowcharts or diagrams may be incorporated into other flowcharts or diagrams where additional functions are performed before or after the functions shown in the diagrams of this application. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An unmanned aerial vehicle comprising:
    a rotary wing system configured to aerodynamically lift the vehicle in the air;
    a flight controller configured to control a movement of the vehicle while airborne;
    a surface contaminant sensor configured to measure a contamination state of a surface; and
    a cleansing controller configured to manage a removal of a surface contaminant from a selected portion of a surface of an external object using an airflow generated by the rotary wing system and based on data acquired by the surface contaminant sensor;
    wherein measuring the contamination state of the surface occurs prior to an initial removal of the surface contaminant; and
    wherein the cleansing controller is configured to:
        determine an airflow force sufficient to dislodge the surface contaminant;
        direct only a portion of a total airflow generated by the rotary wing system at the selected portion of the surface based on the determined airflow force; and
        select the direction of the portion of the airflow based on data from the surface contaminant sensor.

2. The vehicle of claim 1, wherein the surface contaminant sensor is configured to measure a size or characteristic of particles located on a portion of the surface of the external object.

3. The vehicle of claim 1, wherein the surface contaminant sensor includes an optical sensor.

4. The vehicle of claim 1, wherein the surface contaminant sensor includes an ultrasound sensor.

5. The vehicle of claim 1, wherein the surface contaminant sensor includes a polarized light source and an optical sensor configured to detect at least one of a presence or an amount of diffuse reflection of polarized light by the surface, the polarized light first emitted by the polarized light source.

6. The vehicle of claim 1, wherein the flight controller is responsive to an instruction from the cleansing controller to direct at least a portion of the airflow generated by the rotary wing system at a selected portion of the surface with sufficient force to dislodge the surface contaminant.

7. The vehicle of claim 1, wherein the flight controller is configured to control a cleaning route of the vehicle relative to the selected portion of the surface in response to a record of a previous cleaning activity.

8. The vehicle of claim 1, wherein the flight controller controls a cleaning route taken by the unmanned aerial vehicle based on a characteristic of the surface contaminant measured by the surface contaminant sensor.

9. The vehicle of claim 1, wherein the rotary wing system includes a helicopter, quad-copter, or quad-rotor configuration.

10. The vehicle of claim 1, wherein the rotary wing system includes a protective structure to decrease any damage caused by a contact between the rotary wing system and the external object.

11. The vehicle of claim 1, wherein the rotary wing system includes a duct which partially surrounds at least a portion of the rotary wing system.

12. The vehicle of claim 1, wherein the external object includes a solar panel.

13. The vehicle of claim 1, wherein the external object includes an exterior window of a building or other stationary structure.

14. The vehicle of claim 1, wherein the external object includes a component of an electrical power transmission line.

15. The vehicle of claim 1, wherein the external object includes a mirror or an array of mirrors.

* * * * *